United States Patent
Fujiwara

(10) Patent No.: US 9,353,772 B2
(45) Date of Patent: May 31, 2016

(54) HYDRAULIC CONTROL APPARATUS

(71) Applicant: KAYABA INDUSTRY CO., LTD., Tokyo (JP)

(72) Inventor: Takeshi Fujiwara, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 14/416,283

(22) PCT Filed: Oct. 29, 2013

(86) PCT No.: PCT/JP2013/079204
§ 371 (c)(1),
(2) Date: Jan. 22, 2015

(87) PCT Pub. No.: WO2014/073416
PCT Pub. Date: May 15, 2014

(65) Prior Publication Data
US 2015/0226236 A1 Aug. 13, 2015

(30) Foreign Application Priority Data
Nov. 7, 2012 (JP) .................................. 2012-245783

(51) Int. Cl.
| | | |
|---|---|---|
| *F15B 13/042* | (2006.01) | |
| *F16K 27/00* | (2006.01) | |
| *F15B 13/08* | (2006.01) | |
| *F15B 11/16* | (2006.01) | |
| *F16K 11/00* | (2006.01) | |
| *F16K 27/04* | (2006.01) | |

(52) U.S. Cl.
CPC ........... *F15B 13/0426* (2013.01); *F15B 11/166* (2013.01); *F15B 13/0842* (2013.01); *F16K 11/00* (2013.01); *F16K 27/00* (2013.01); *F16K 27/003* (2013.01); *F16K 27/041* (2013.01); *Y10T 137/7768* (2015.04); *Y10T 137/87885* (2015.04)

(58) Field of Classification Search
CPC ................. Y10T 137/87864; Y10T 137/7768; Y10T 137/87885; E02F 9/2267; F15B 13/0402; F15B 13/042; F15B 2211/75; F15B 13/0426; F15B 13/0842; F15B 11/166; F16K 11/07; F16K 27/00; F16K 27/003; F16K 27/041; F16K 11/00
USPC .................................................. 137/606, 884
See application file for complete search history.

(56) References Cited

U.S. PATENT DOCUMENTS 6,325,104 B1 * 12/2001 Yamashita ............ F15B 11/162
137/884
7,415,822 B1 * 8/2008 Harber .................. E02F 9/2232
60/413

FOREIGN PATENT DOCUMENTS

| JP | 04-073404 A | 3/1992 |
| JP | 2000-266002 A | 9/2000 |
| JP | 2008-175281 A | 7/2008 |

*Primary Examiner* — William McCalister
(74) *Attorney, Agent, or Firm* — Rabin & Berdo, P.C.

(57) ABSTRACT

A hydraulic control apparatus includes: a plurality of spools incorporated into a valve main body; a cap provided on the valve main body; pilot chambers provided in the cap to correspond to the respective spools; a maximum pressure introduction passage to which a maximum pressure of the pilot chambers is led; connecting passages connecting the maximum pressure introduction passage to the respective pilot chambers; and selection valves provided in the connecting passages. The maximum pressure of the respective pilot chambers is selected by the selection valve and led to the maximum pressure introduction passage. The maximum pressure introduction passage is provided in the cap on an opposite side of the pilot chambers to a side on which the valve main body is provided.

10 Claims, 4 Drawing Sheets

HYDRAULIC CONTROL APPARATUS

TECHNICAL FIELD

The present invention relates to a hydraulic control apparatus including a plurality of pilot chambers.

BACKGROUND ART

JP2008-175281A describes this type of hydraulic control apparatus.

This conventional hydraulic control apparatus includes a valve main body into which a plurality of spools are incorporated, a plurality of caps provided in accordance with the plurality of spools, pilot chambers provided in the respective caps, and an oil passage plate interposed between the caps and the valve main body. A plurality of plates constituting the oil passage plate are integrated using bolts or the like. The bolts are provided on an outer side of the pilot chambers to avoid interference with the pilot chambers. A pilot pressure is led to the pilot chambers, and the spools are switched by an action of the pilot pressure.

A maximum pressure introduction passage is formed in the oil passage plate in an orthogonal direction to axes of the respective spools. The maximum pressure introduction passage is formed in an offset position from the pilot chambers, and therefore the pilot chambers and the maximum pressure introduction passage maintain a non-interfering positional relationship.

Selection valves for selecting a maximum pressure are provided in connection passages connecting the maximum pressure introduction passage to the respective pilot chambers. The pilot pressure in the pilot chamber acts on one side of the selection valve, and a pressure in the maximum pressure introduction passage acts on another side.

SUMMARY OF INVENTION

In this conventional hydraulic control apparatus, the oil passage plate provided with the maximum pressure introduction passage must be interposed between the caps and the valve main body, and the maximum pressure introduction passage must be formed in an offset position from the pilot chambers so as not to interfere with the pilot chambers. As a result, design freedom is limited.

An object of the present invention is to provide a hydraulic control apparatus in which a maximum pressure introduction passage can be provided while maintaining design freedom.

According to one aspect of the present invention, a hydraulic control apparatus having a plurality of pilot chambers is provided. The hydraulic control apparatus includes a plurality of spools incorporated into a valve main body, a cap provided on the valve main body, pilot chambers provided in the cap to correspond to the respective spools, a maximum pressure introduction passage which is provided in the cap, and to which a maximum pressure of the pilot chambers is led, connecting passages connecting the maximum pressure introduction passage to the respective pilot chambers and selection valves provided in the connecting passages. The maximum pressure of the respective pilot chambers is selected by the selection valve and led to the maximum pressure introduction passage, the valve main body is provided on one side of the pilot chambers, and the maximum pressure introduction passage is provided on an opposite side of the pilot chambers to the valve main body.

Embodiments and advantages of the present invention are set forth in detail below with reference to the attached figures.

DESCRIPTION OF EMBODIMENTS

Referring to FIGS. 1 to 4, an embodiment of the present invention will be described.

Figure 4:
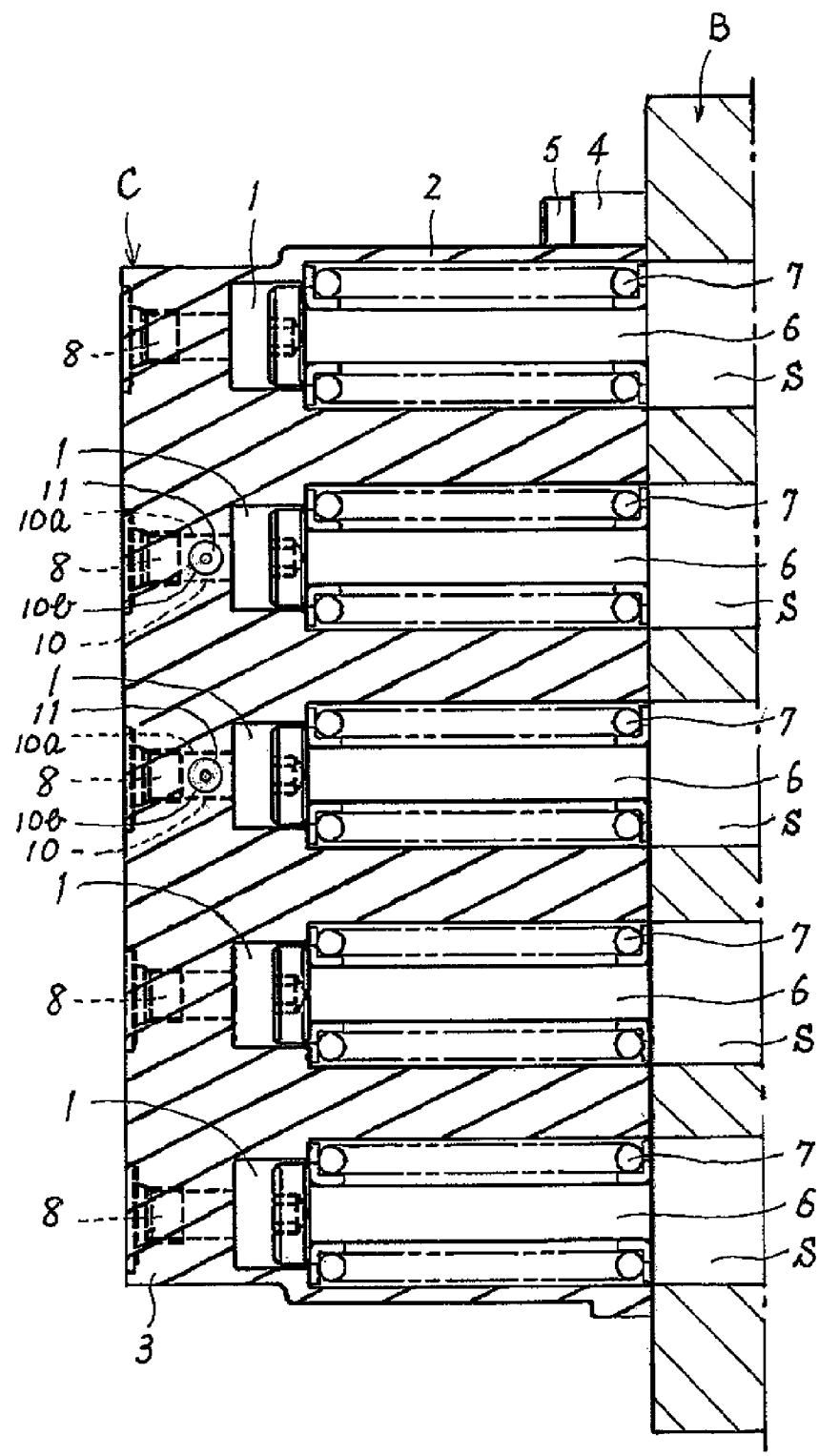
FIG. 4 is a sectional view of FIG. 2, taken along a IV-IV line.

As shown in FIG. 4, a plurality of spools S are provided in a valve main body B to be free to slide. A single cap C in which a plurality of pilot chambers 1 corresponding respectively to the spools S are formed is fixed to the valve main body B. Outer shapes of locations of the cap C corresponding to the respective pilot chambers 1 are set as cylindrical projecting portions 2. A projecting portion 3 is molded integrally with an outer side (a left side end in FIG. 1) of the cylindrical projecting portion 2.

Figure 1:
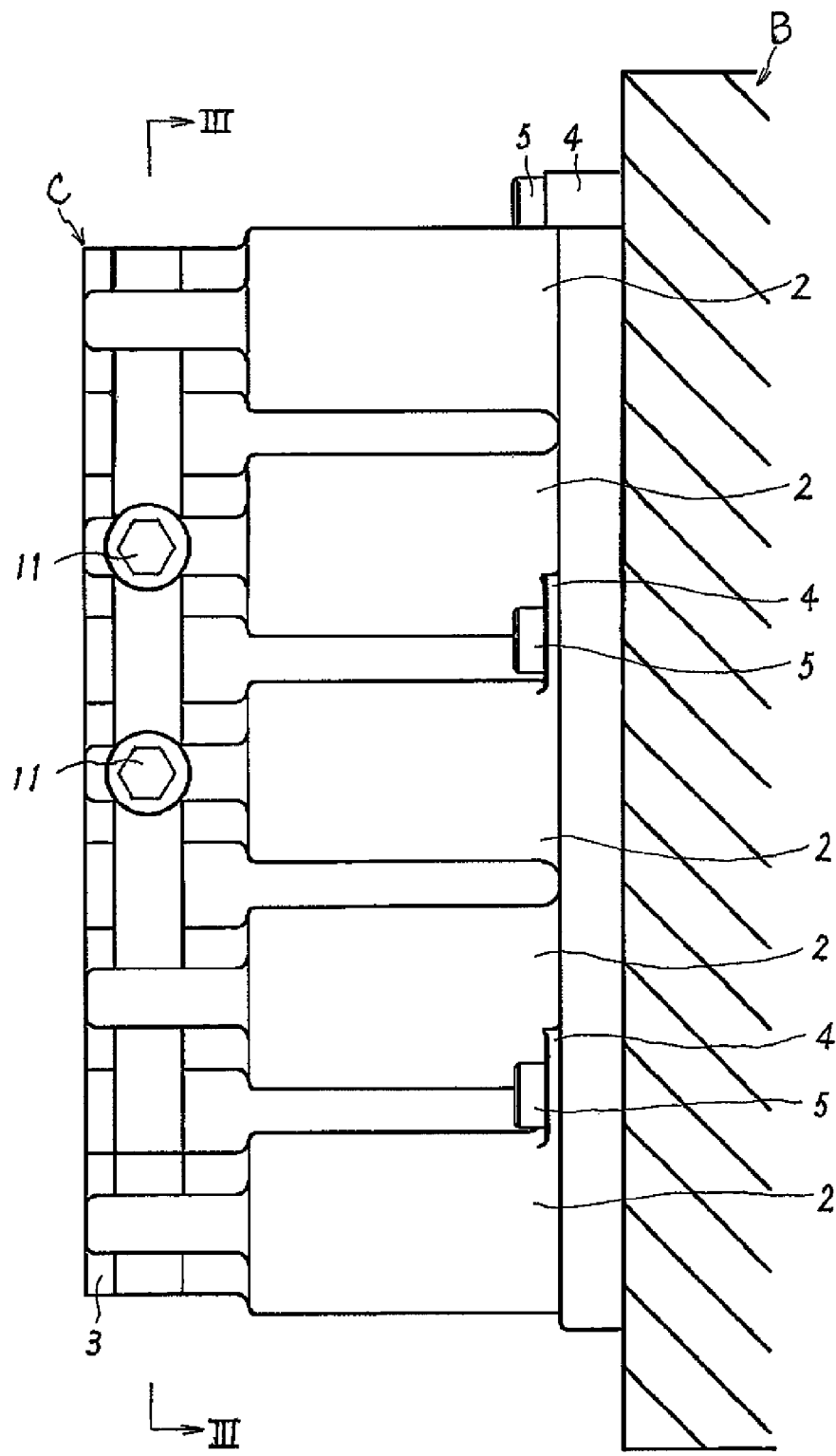
FIG. 1 is a front view of a cap provided on a valve main body.
Figure 2:
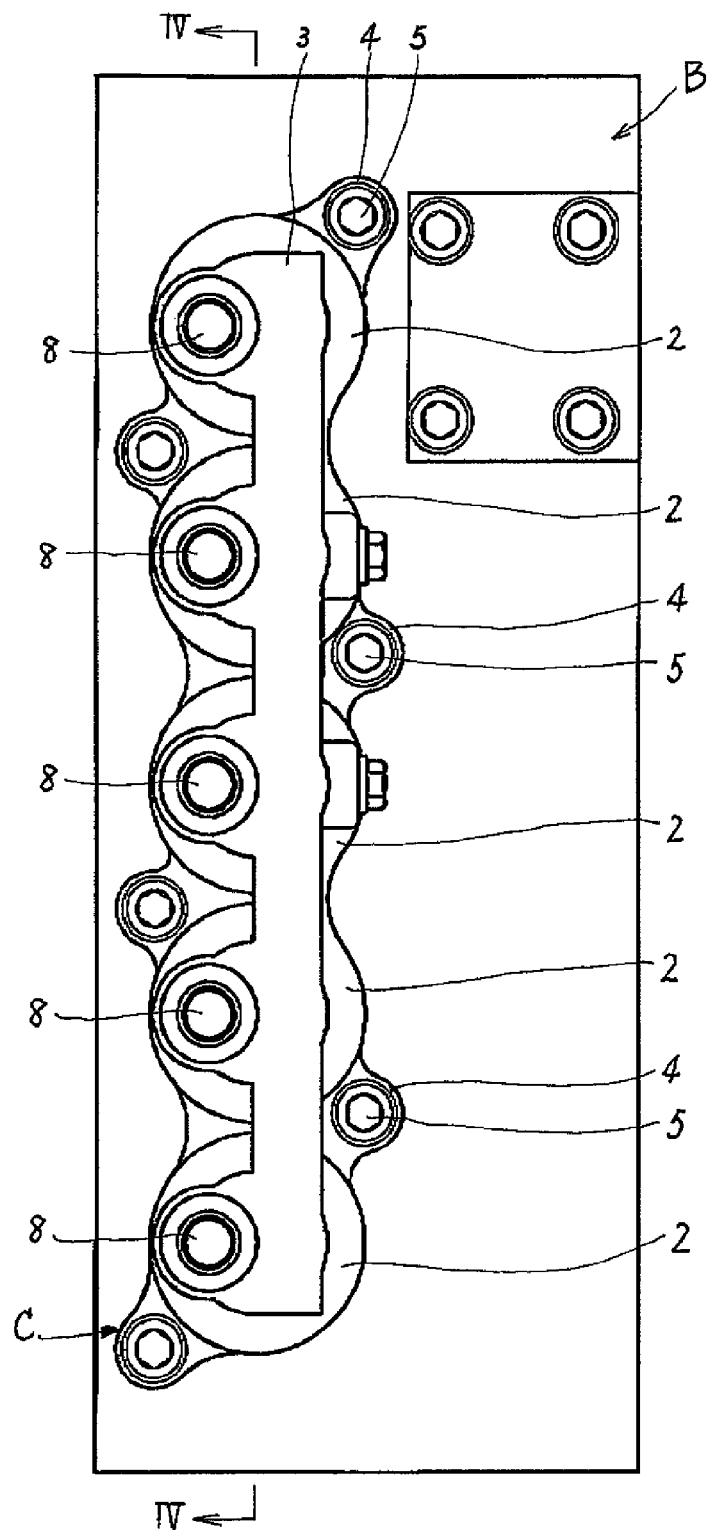
FIG. 2 is a side view of the cap provided on the valve main body.
Figure 3:
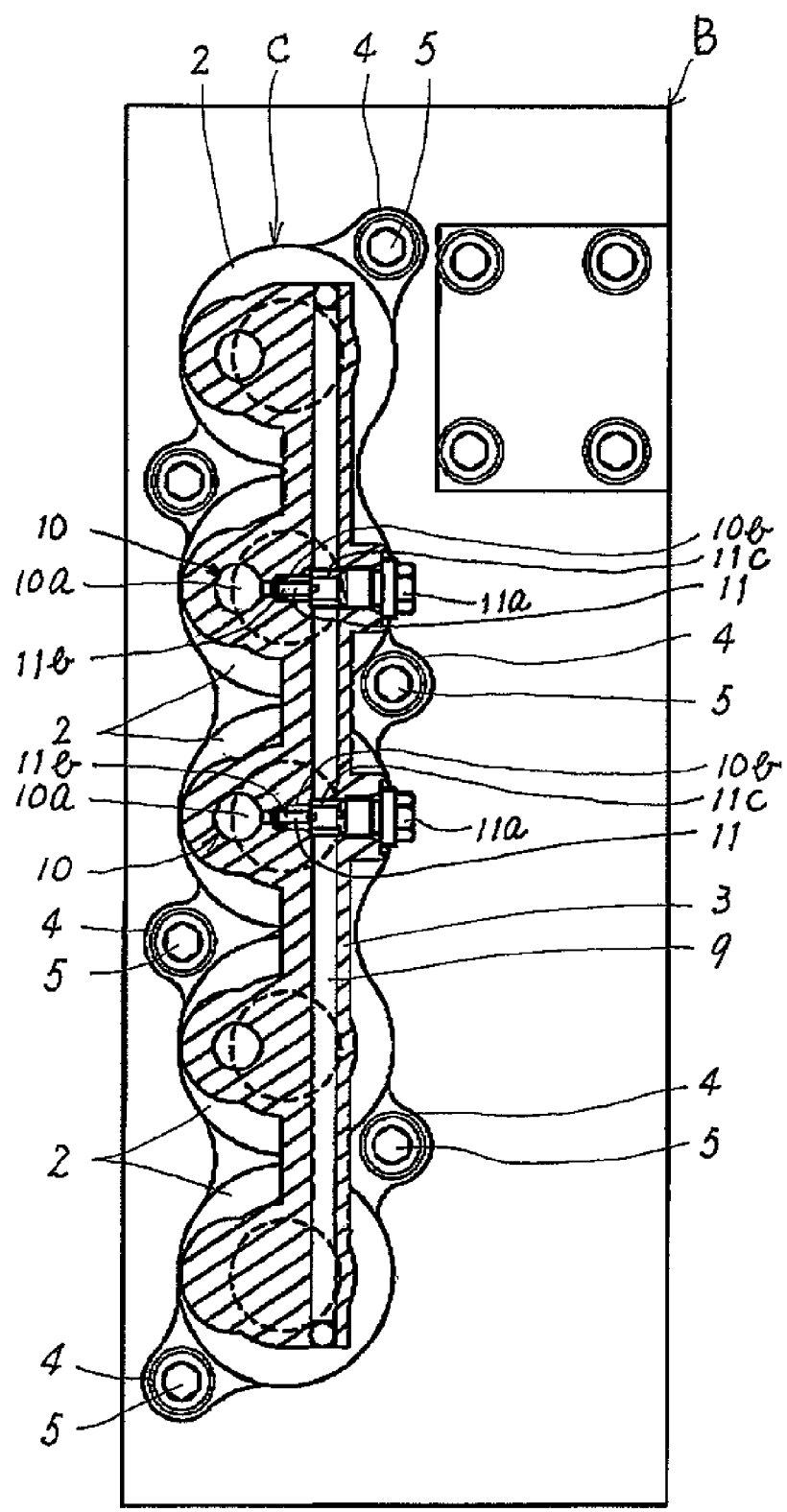
FIG. 3 is a sectional view of FIG. 1, taken along a III-III line.

As shown in FIG. 3, a plurality of bolting portions 4 for fixing the cap C to the valve main body B are formed in an outer peripheral part of the cap C in a diagonally opposed manner such that the respective pilot chambers 1 are sandwiched there between. At least one of the bolting portions 4 is formed in a position shared by adjacent pilot chambers 1. The cap C is fixed to the valve main body B by passing bolts 5 through the bolting portions 4. By providing the bolting portions 4 in a diagonally opposed manner such that the pilot chamber 1 is sandwiched there between, the number of bolting portions 4 can be reduced in comparison with a case where a pair of bolting portions 4 is provided for each pilot chamber 1, for example. In so doing, the number of bolts 5 can also be reduced, enabling a reduction in cost.

As shown in FIG. 4, a spool end 6 is provided on an extension of the axis of the spool S so as to face the interior of the pilot chamber 1. A spring 7 that exerts a spring force on the spool S extends along the spool end 6. By providing the spring 7 to extend along the spool end 6, when a pilot pressure acts on the pilot chamber 1, the spring force of the spring 7 can be exerted on the spool S with stability.

A pilot pressure introduction port 8 for introducing the pilot pressure into the pilot chamber 1 is formed in the projecting portion 3. Further, a maximum pressure introduction passage 9 is formed in a straight line through the projecting portions 3 so as to penetrate in an orthogonal direction to the axes of the spools S, or in other words an arrangement direction of the pilot chambers (see FIG. 3).

The maximum pressure introduction passage 9 communicates with the respective pilot chambers 1 via connecting passages 10. The connecting passages 10 are formed in an orthogonal direction to the maximum pressure introduction passage 9. More specifically, each connecting passage 10 is constituted by a first connecting portion 10a formed along the axis of the spool S, and a second connecting portion 10b formed between the first connecting portion 10a and the maximum pressure introduction passage 9 to be orthogonal to the first connecting portion 10a.

The first connecting portion 10a connects the pilot chamber 1 to the second connecting portion 10b, and the second connecting portion 10b connects the first connecting portion 10a to the maximum pressure introduction passage 9. Hence, the pilot chamber 1 and the maximum pressure introduction passage 9 communicate via the first and second connecting passages 10a, 10b. The first connecting portion 10a is formed in a position that avoids a center of the pilot chamber 1.

Selection valves 11 for selecting a maximum pilot pressure among predetermined pilot chambers 1 are incorporated respectively into the second connecting portions 10b. The selection valve 11 is constituted by a plug 11a, a poppet 11b, and a spring 11c provided between the plug 11a and the poppet 11b in order to exert a spring force on the poppet 11b.

A pressure in a predetermined pilot chamber 1, introduced from the first connecting portion 10a, acts on one side of the selection valve 11, and a pressure in the maximum pressure introduction passage 9 acts on another side. Communication between the first connecting portion 10a and the second connecting portion 10b is normally blocked by an action of the spring force of the spring 11c. However, when a pressure on the first connecting portion 10a side becomes higher than a pressure on the second connecting portion 10b side, or in other words the pressure in the maximum pressure introduction passage 9, the poppet 11b moves against the spring force of the spring 11c such that the first connecting portion 10a and the second connecting portion 10b communicate with each other. In other words, the selection valve 11 is configured such that when the pressure in the pilot chamber 1 is higher than the pressure in the maximum pressure introduction passage 9, the pressure in the pilot chamber 1 is led into the maximum pressure introduction passage 9.

The selection valve 11 is incorporated from a side face of the cap C in a direction that intersects the axis of the spool S. When, on the other hand, the selection valve is incorporated in an axial direction of the spool, as in the conventional apparatus, an axial direction length of spool increases. In this embodiment, however, the selection valve 11 is incorporated in a direction that intersects the axis of the spool S, and therefore, in contrast to the related art, the axial direction length does not increase.

Further, since the selection valve 11 is incorporated in a direction that intersects the axis of the spool S, a replacement operation to replace only the selection valve 11, for example, can be performed easily. If the selection valve 11 were incorporated along the axis of the spool S, it would be necessary to remove the cap C temporarily from the valve main body B in order to replace the selection valve 11. By incorporating the selection valve 11 in a direction that intersects the axis of the spool S, however, the selection valve 11 can be replaced without removing the cap C from the main body B.

According to this embodiment, the highest pilot pressure among the predetermined pilot chambers 1 is selected by the selection valve 11 and led to the maximum pressure introduction passage 9. The maximum pressure led to the maximum pressure introduction passage 9 is led from a penetrating end of the maximum pressure introduction passage 9 to another hydraulic device through a passage not shown in the figures, and then used to control the hydraulic device.

In this embodiment, the maximum pressure introduction passage 9 is formed in the cap C, and there is therefore no need to provide a special oil pressure plate, as in the related art. As a result, the hydraulic control apparatus can be simplified in configuration and reduced in cost.

Further, the maximum pressure introduction passage 9 is provided in the cap on an opposite side of the pilot chambers 1 to the valve main body B. In other words, the valve main body B is provided on one side of the pilot chambers 1, and the maximum pressure introduction passage 9 is provided on an opposite side of the pilot chambers 1 to the valve main body B. As a result, a reduction in size and an increase in design freedom can be achieved in comparison with a case such as that of the related art, in which the maximum pressure introduction passage is offset in an orthogonal direction to the axes of the spools S so as not to interfere with the pilot chambers.

Furthermore, the maximum pressure introduction passage 9 penetrates the cap in a straight line in an orthogonal direction to the axes of the spools S, or in other words the arrangement direction of the pilot chambers. Therefore, pressure loss is small, and a cutting process for forming the maximum pressure introduction passage 9 is simple.

Moreover, in this embodiment, the first connecting portions 10a are formed in positions avoiding the centers of the respective pilot chambers formed in the cap C, and therefore spaces are formed in the projecting portions 3 of the cap C. The maximum pressure introduction passage 9 can be formed in these spaces.

Embodiments of the present invention were described above, but the above embodiments are merely examples of applications of the present invention, and the technical scope of the present invention is not limited to the specific constitutions of the above embodiments.

This application claims priority based on Japanese Patent Application No. 2012-245783 filed with the Japan Patent Office on Nov. 7, 2012, the entire contents of which are incorporated into this specification.

The invention claimed is:

1. A hydraulic control apparatus, comprising:
   a valve main body having a plurality of spools therein; and
   a cap provided on the valve main body, the cap including
      a plurality of pilot chambers each of which corresponds to a respective one of the plurality of spools,
      a maximum pressure introduction passage to which a maximum pressure of the pilot chambers is led from at least two of the plurality of pilot chambers;
      at least two connecting passages, each of which is configured to connect a respective one of the at least two of the plurality of pilot cambers to the maximum pressure introduction passage, and
      at least two selection valves, each of which is provided in a respective one of the at least two connecting passages, the selection valves being configured to lead the maximum pressure of the at least two of the pilot chambers to the maximum pressure introduction passage, the selection valves being inserted from a side face of the cap in a direction that intersects an axis of the spools, wherein
   the valve main body is provided on one side of the pilot chambers, and
   the maximum pressure introduction passage included in the cap is provided on an opposite side of the pilot chambers to the valve main body.

2. The hydraulic control apparatus as defined in claim 1, wherein a plurality of bolting portions for fixing the cap to the valve main body are provided in the cap in a diagonally opposed manner such that the pilot chambers are sandwiched there between, and
   at least one of the bolting portions is used for fixing the cap to adjacent two pilot chambers.

3. The hydraulic control apparatus as defined in claim 1, wherein the maximum pressure introduction passage is formed in a straight line intersecting axes of each of the spools.

4. The hydraulic control apparatus as defined in claim 1, wherein the at least two connecting passages each are formed in an orthogonal direction to the maximum pressure introduction passage and provided in parallel.

5. The hydraulic control apparatus as defined in claim 1, wherein a pressure in each of the at least two of the pilot chambers acts on one side of a corresponding one of the at least two selection valves through a corresponding one of the at least two connection passages, and the pressure in the maximum pressure introduction passage acts on another side of the corresponding one of the at least two selection valves, and when a pressure in a pilot chamber is higher than the pressure in the maximum pressure introduction passage, the pressure in the pilot chamber is led to the maximum pressure introduction passage.

6. The hydraulic control apparatus as defined in claim 4, wherein the maximum pressure introduction passage penetrates in an arrangement direction of the at least two of the pilot chambers such that a maximum pressure among pilot pressures in the at least two of the pilot chambers is extracted from a penetrating end thereof.

7. The hydraulic control apparatus as defined in claim 1, wherein each of the at least two connecting passages includes a first connecting portion and a second connecting portion, the first connecting portion is formed along the axis of a corresponding one of the spools so as to connect a corresponding one of the at least two of the plurality of pilot chambers to the second connecting portion, the second connecting portion is formed orthogonally to the first connecting portion so as to connect the first connecting portion to the maximum pressure introduction passage, and a corresponding one of the at least two of selection valves is provided in the second connecting portion.

8. The hydraulic control apparatus as defined in claim 7, wherein a plurality of pilot pressure introduction ports each of which introduces a pilot pressure into a corresponding one of the plurality of pilot chambers are formed in the cap, and the first connecting portion of a corresponding one of the at least two connection passages is formed in a position that avoids a center of the corresponding one of the at least two of the plurality of pilot chambers.

9. The hydraulic control apparatus as defined in claim 1, wherein the at least two selection valves each are configured to open when a pressure in a corresponding one of the at least two of the pilot chambers becomes higher than a pressure in the maximum pressure introduction passage so that the maximum pressure of the at least two of the pilot chambers is led to the maximum pressure introduction passage.

10. The hydraulic control apparatus as defined in claim 1, wherein the at least two selection valves are inserted from the side face of the cap in the direction that intersects the axis of the spools so that the at least two selection valves are replaceable without removing the cap from the valve main body.

* * * * *